(12) United States Patent
Peng

(10) Patent No.: US 9,173,159 B2
(45) Date of Patent: Oct. 27, 2015

(54) X2 HANDOVER METHOD AND DEVICE

(75) Inventor: Cong Peng, Shenzhen (CN)

(73) Assignee: ZTE Corporation, Shenzhen, GD (CN)

( * ) Notice: Subject to any disclaimer, the term of this patent is extended or adjusted under 35 U.S.C. 154(b) by 0 days.

(21) Appl. No.: 14/342,207

(22) PCT Filed: Feb. 23, 2012

(86) PCT No.: PCT/CN2012/071500
§ 371 (c)(1),
(2), (4) Date: Mar. 24, 2014

(87) PCT Pub. No.: WO2012/152105
PCT Pub. Date: Nov. 15, 2012

(65) Prior Publication Data
US 2014/0220983 A1     Aug. 7, 2014

(30) Foreign Application Priority Data

Aug. 30, 2011   (CN) .......................... 2011 1 0252538

(51) Int. Cl.
*H04W 40/36* (2009.01)
*H04W 36/00* (2009.01)

(52) U.S. Cl.
CPC .......... *H04W 40/36* (2013.01); *H04W 36/0005* (2013.01); *H04W 36/0011* (2013.01); *H04W 36/0033* (2013.01); *H04W 36/0055* (2013.01); *H04W 36/0072* (2013.01)

(58) Field of Classification Search
CPC ............ H04W 40/36; H04W 36/0055; H04W 36/0072; H04W 36/0005; H04W 36/0011; H04W 36/0033
USPC ........... 455/438, 436, 441; 370/331, 328, 329
See application file for complete search history.

(56) References Cited

U.S. PATENT DOCUMENTS

| 2010/0189076 | A1* | 7/2010 | Kim .............................. 370/331 |
| 2011/0268085 | A1* | 11/2011 | Barany et al. ................. 370/331 |
| 2014/0148174 | A1* | 5/2014 | Teyeb et al. ................... 455/441 |

FOREIGN PATENT DOCUMENTS

| CN | 101730032 | 6/2010 |
| CN | 102271373 | 12/2011 |

OTHER PUBLICATIONS

An International Search dated May 31, 2012, which issued during the prosecution of Applicant's PCT/CN2012/071500.

(Continued)

*Primary Examiner* — Khai M Nguyen
(74) *Attorney, Agent, or Firm* — Diederiks & Whitelaw, PLC

(57) ABSTRACT

The disclosure provides an X2 handover method and device, the method comprises: after sending a Handover Request Acknowledge message, a target eNB sets, for handed-over UE, a flag for indicating whether or not a Sequence Number Status Transfer message is received and sets the flag to be 'not received'; and after receiving an RRC Connection Reconfiguration Complete message, the target eNB directly sends a Path Switch Request message to a core network without determining whether or not the Sequence Number Status Transfer message is received. With the technical scheme provided in the disclosure, the problem in the current X2 handover is solved that handover delay is increased as an RRC Connection Reconfiguration completion message is received by a target side prior to a Sequence Number Status Transfer message, thus simplifying the processing of a target eNB and increasing handover speed.

12 Claims, 7 Drawing Sheets after sending a Handover Request Acknowledge message, a target eNB sets, for handed-over UE, a flag for indicating whether or not a Sequence Number Status Transfer message is received and sets the flag to be 'not received' — S202 after receiving an RRC Connection Reconfiguration Complete message, the target eNB directly sends a Path Switch Request message to a core network without determining whether or not the Sequence Number Status Transfer message is received — S204

(56) References Cited

OTHER PUBLICATIONS

Written Opinion dated May 31, 2012, which issued during the prosecution of Applicant's PCT/CN2012/071500.

An International Prelminary Report on Patentability dated Mar. 4, 2014, which issued during the prosecution of Applicant's PCT/CN2012/071500.

* cited by examiner

X2 HANDOVER METHOD AND DEVICE

CROSS-REFERENCE TO RELATED APPLICATIONS

This application represents a National Stage of PCT/CN2012/071500, filed on Feb. 23, 2012 which claims priority to Chinese Application No. 201110252538.8, filed on Aug. 30, 2011. The entire disclosure of each of the above applications is incorporated herein by reference.

TECHNICAL FIELD

The disclosure relates to the communication field and in particular to an X2 handover method and device.

BACKGROUND

Mobility management is an important attribute of mobile communication systems, and handover is the key of mobility management, a rational handover can reduce the possibility of the sudden loss of the connection of User Equipment (UE) and the interruption of service data and improves system stability and user experience.

In a Long Term Evolution (LTE) system, UE is in an RRC_CONNECTED status or an RRC_IDLE status. When the UE in the RRC_CONNECTED status enters another cell from a service cell, a cross-cell handover is trigged to guarantee a service not to be interrupted.

A cross-eNodeB handover is trigged when the UE is handed over from a cell of an Evolved Node B (eNB) to a cell of another eNB. If there is an X2 interface which is located between a handover source eNodeB and a handover target eNodeB, and the handover source eNodeB and the handover target eNodeB are connected with the same Mobility Management Entity (MME), a source eNB will initiate an X2 interface handover, otherwise, the source eNB will initiate an S1 interface handover, according to existing technologies (3GPP protocol, 23.401).

In an LTE system, the data transmission modes of a Radio Link Control (RLC) layer include an Acknowledged Mode (AM), an Unacknowledged Mode (UM) and a Transparent Mode (TM). In the AM, as data needs to be delivered in sequence, each packet is ordered by sequence number, that is, by Packet Data Convergence Protocol Sequence Number (PDCP SN). As there is no need to reset PDCP SNs during a handover, that is, the PDCP SNs need to be successive before and after a handover, a Sequence Number (SN) Status Transfer message is defined in 3GPP protocols to send to a target eNB the PDCP SNs of each E-UTRAN Radio Access Bearer (E-RAB) (service) in an AM for the data transmission between a source eNB and UE so that the user plane of the target eNB can transmit data with the PDCP SNs received to guarantee the continuity of uplink and downlink data.

If the handed-over UE has AM services, in order to guarantee AM data to be received and sent in sequence after a handover, a Sequence Number Status Transfer message must be received by the target eNB prior to the completion of the handover.

According to the description of a protocol (3GPP protocol, 36, 300), an X2 handover flow, as shown in FIG. 1, can be briefly described as follows:

1. a source eNB sends a Handover Request message to a target eNB;
2. the target eNB prepares resources and sends a Handover Request Acknowledge message to the source eNB;
3. the source eNB sends an RRC Connection Reconfiguration message to the UE;
4. the source eNB sends a Sequence Number Status Transfer message to the target eNB;
5. the UE sends an RRC Connection Reconfiguration Complete message to the target eNB;
6. the target eNB sends a Path Switch Request message to a core network;
7. the core network sends a Path Switch Acknowledge message to the target eNB;
8. the target eNB sends the UE Context Release message to the source eNB.

In the above-mentioned flow, for the target eNB, the Sequence Number Status Transfer message is received prior to the RRC Connection Reconfiguration Complete message. However, if the processing of the source eNB or the link of an X2 interface is faulted, the target eNB may receive the RRC Connection Reconfiguration Complete message from the UE prior to the Sequence Number Status Transfer message or the Sequence Number Status Transfer message is lost. Further, according to the description of the protocol (3GPP protocol, 36, 300), if there is no AM service, the source eNB may send no Sequence Number Status Transfer message, that is, the target eNB may receive no Sequence Number Status Transfer message. Thus, the target eNB needs a Sequence Number Status Transfer message when the UE having AM services is handed over, and needs no Sequence Number Status Transfer message when the UE having no AM service is handed over. However, in existing handover flow, the target eNB delays the transmission of a Path Switch Request message if the target eNB receives an RRC Connection Reconfiguration Complete message prior to a Sequence Number Status Transfer message, which increases handover delay and complicates the processing of the handover flow as two timers are started to synchronously wait for the Sequence Number Status Transfer message and the RRC Connection Reconfiguration Complete message. Aiming at the problems above, no effective solution has been proposed.

SUMMARY

The disclosure provides an X2 handover method and device to solve at least one of the problems above.

According to one aspect of the disclosure, an X2 handover method is provided, which includes: after sending a Handover Request Acknowledge message, a target eNB sets, for handed-over UE, a flag for indicating whether or not a Sequence Number Status Transfer message is received and sets the flag to be 'not received'; and after receiving an RRC Connection Reconfiguration Complete message, the target eNB directly sends a Path Switch Request message to a core network without determining whether or not a Sequence Number Status Transfer message is received.

Before the target eNB directly sends the Path Switch Request message to the core network without determining whether or not a Sequence Number Status Transfer message is received after receiving the RRC Connection Reconfiguration Complete message, the method further includes: the target eNB sets the flag to be 'received' if the target eNB receives the Sequence Number Status Transfer message when waiting for the completion of the RRC Connection Reconfiguration by the UE.

After the target eNB directly sends a Path Switch Request message to the core network without determining whether or not a Sequence Number Status Transfer message is received after receiving the RRC Connection Reconfiguration Complete message, the method further includes: the target eNB sets the flag to be 'received' if the target eNB receives the Sequence Number Status Transfer message when waiting for a Path Switch Acknowledge message.

After the target eNB directly sends the Path Switch Request message to the core network without determining whether or not the Sequence Number Status Transfer message is received after receiving the RRC Connection Reconfiguration Complete message, the method further includes: the target eNB determines whether or not successfully handed-over services include AM services after receiving the Path Switch Acknowledge message sent from the core network and determining that the handover is succeeded if the successfully handed-over services include no AM service.

The target eNB determines whether or not successfully handed-over services include the AM services after receiving the Path Switch Acknowledge message sent from the core network, continuing to determine whether or not the flag has been set to be 'received' if successfully handed-over services include the AM services, and, determines that the handover is succeeded if the flag has been set to be 'received', or releases the AM services of the UE if the flag has not been set to be 'received'.

According to another aspect of the disclosure, an X2 handover device located on an eNB is provided, which includes: a flag setting module configured to set, for handed-over UE, a flag for indicating whether or not a Sequence Number Status Transfer message is received after the eNB sends a Handover Request Acknowledge message, and to set the flag to be 'not received'; and a direct sending module configured to directly send a Path Switch Request message to a core network without determining whether or not a Sequence Number Status Transfer message is received after the eNB receives an RRC Connection Reconfiguration Complete message.

The device further includes: a first modification module configured to set the flag to be 'received' if the target eNB receives the Sequence Number Status Transfer message when waiting for the completion of the RRC Connection Reconfiguration by the UE.

The device further includes: a second modification module configured to set the flag to be 'received' if the target eNB receives the Sequence Number Status Transfer message when waiting for a Path Switch Acknowledge message.

The device further includes: a service determination module configured to determine whether or not successfully handed-over services include AM services after the eNB receives the Path Switch Acknowledge message sent from the core network and determine that the handover is succeeded if the successfully handed-over services include no AM services.

The device further includes: a flag determination module configured to determine whether or not the flag has been set to be 'received' if successfully handed-over services include the AM services, and, to determine the handover is succeeded if the flag has been set to be 'received', or to release the AM services of the UE if the flag has been set to be 'not received'.

In the disclosure, a target eNB sets, for handed-over UE, a flag for indicating whether or not a Sequence Number Status Transfer message is received and directly sends a Path Switch Request message to a core network after receiving an RRC Connection Reconfiguration Complete message, without determining whether or not a Sequence Number Status Transfer message is received. Through the disclosure, the problem in the current X2 handover that handover delay is increased when an RRC Connection Reconfiguration Complete message is received by a target side prior to a Sequence Number Status Transfer message, thus simplifying the processing of the target eNB and increasing handover speed.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DETAILED DESCRIPTION OF THE EMBODIMENTS

The preferred embodiments are described in conjunction with the drawings as follows. It shall be understood that the embodiments of the present application and the features of the embodiments can be combined with each other if there is no conflict.

Figure 1:
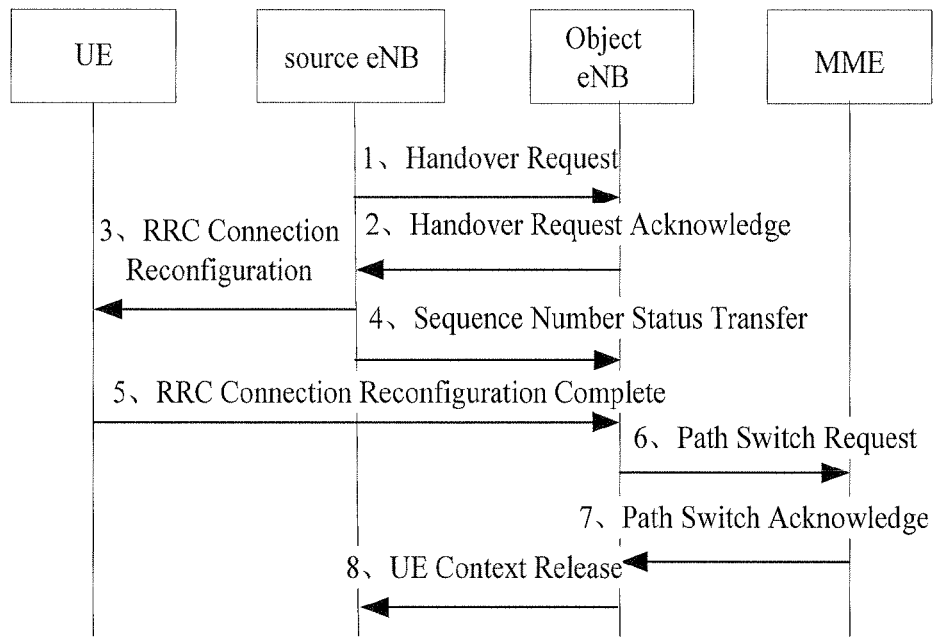
FIG. 1 is a flowchart illustrating an X2 handover flow described in existing protocols and involving UE, a handover source eNB, a target eNB and a core network.
Figure 2:
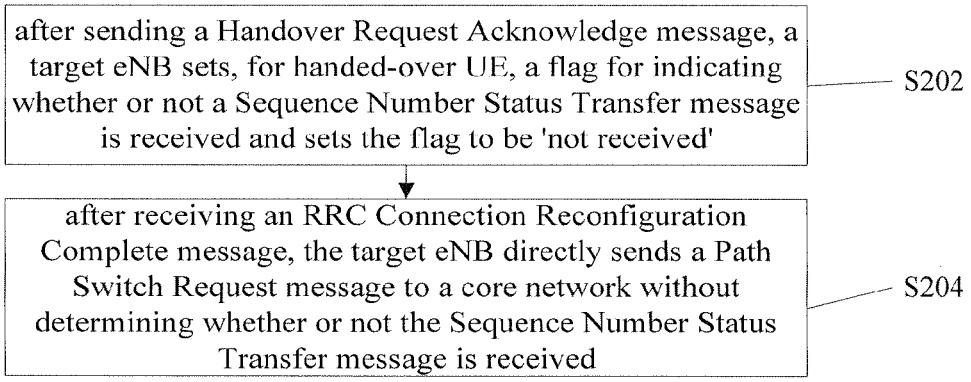
FIG. 2 is a flowchart illustrating an X2 handover method according to an embodiment of the disclosure.

FIG. 2 is a flowchart illustrating an X2 handover method according to an embodiment of the disclosure. As shown in FIG. 2, according to an embodiment of the disclosure, an X2 handover method includes:

S202: after sending a Handover Request Acknowledge message, a target eNB sets, for a handed-over UE, a flag for indicating whether or not a Sequence Number Status Transfer message is received, and sets the flag to be 'not received'.

S204: after receiving an RRC Connection Reconfiguration Complete message, the target eNB directly sends a Path Switch Request message to a core network without determining whether or not the Sequence Number Status Transfer message is received.

In the X2 handover method provided herein which is an improvement of existing X2 handover method, a target eNB directly sends a Path Switch Request message to a core network after receiving an RRC Connection Reconfiguration Complete message, without considering whether or not a Sequence Number Status Transfer message is received, and although the target eNB actually needs no Sequence Number Status Transfer message when initiating a path switch after receiving an RRC Connection Reconfiguration Complete message, to provide a criterion for the following determination on whether or not a Sequence Number Status Transfer message is received when the Sequence Number Status Transfer message is needed in the following handover flow, the target eNB sets, for handed-over UE, a flag for indicating whether or not a Sequence Number Status Transfer message is received at the beginning of a handover flow so as to provide an accurate reliable criterion for the following determination on whether or not a Sequence Number Status Transfer message is received. It can be seen from existing X2 handover flow that the setting that a target eNB receives a Sequence Number Status Transfer message prior to the initiation of a Path switch is irrational as no Sequence Number Status Transfer message is actually needed during the initiation of a Path switch by the target eNB receiving an RRC Connection Reconfiguration Complete message, moreover, a faulted link or the absence of AM service in the handed-over UE will make the target eNB incapable of receiving a Sequence Number Status Transfer message, causing a delay in the whole handover flow. By rationally adjusting the way a Sequence Number Status Transfer message is processed, the method provided herein simplifies the processing of a target eNB and improves the whole handover speed.

In a preferred embodiment of the disclosure, after setting a flag for indicating whether or not a Sequence Number Status Transfer message is received for the UE and before receiving an RRC Connection Reconfiguration Complete message, the target eNB sets the flag to be 'received' if the eNB receives a Sequence Number Status Transfer message when waiting for the completion of the RRC Connection Reconfiguration of the UE.

Alternatively, in another preferred embodiment of the disclosure, if the target eNB receives a Sequence Number Status Transfer message when waiting for a Path Switch Acknowledge message after sending a Path Switch Request message to the core network, then the target eNB sets the flag to be 'received'.

The target eNB may receive a Sequence Number Status Transfer message when waiting for the completion of the RRC Connection Reconfiguration of the UE or a Path Switch Acknowledge message, the flag is used to indicate whether or not a Sequence Number Status Transfer message is received, thus, if the target eNB receives a Sequence Number Status Transfer message when waiting for the completion of the RRC Connection Reconfiguration of the UE or a Path Switch Acknowledge message, then the flag is set to be 'received' to guarantee the status represented by the flag is accordant with the actual status.

Preferably, after the target eNB directly sends the Path Switch Request message to the core network without determining whether or not the Sequence Number Status Transfer message is received after receiving the RRC Connection Reconfiguration Complete message, the method further includes: the target eNB determines whether or not successfully handed-over services include AM services after receiving the Path Switch Acknowledge message sent from the core network, and determines that the handover is succeeded if the successfully handed-over services include no AM services.

For the whole handover flow, the Sequence Number Status Transfer message may not be needed, no Sequence Number Status Transfer message is needed during the whole X2 handover flow when the handed-over UE has no AM service. Thus, after receiving the Path Switch Acknowledge message from the core network, the target eNB may further determine whether or not successfully handed-over services include the AM service and directly determines that the handover is succeeded if the successfully handed-over services include no AM service.

Preferably, the target eNB determines whether or not successfully handed-over services include an AM service after receiving the Path Switch Acknowledge message from the core network, continues to determine whether or not the flag has been set to be 'received' if successfully handed-over services include the AM service, and, considers that the handover is succeeded if the flag is determined to be 'received' or releases the AM service of the UE if the flag is determined not to be 'received'.

If the handed-over UE has the AM service, then a Sequence Number Status Transfer message is needed to guarantee the smooth handover of the AM service, in this case, it is needed to make a determination on whether or not the flag has been set to be 'received', the setting of the flag to be 'received' indicates that the target eNB receives the Sequence Number Status Transfer message, in this case, it can be considered that the handover is succeeded, the setting of the flag to be 'not received' indicates that the target eNB receives no Sequence Number Status Transfer message, in this case, to minimize the possibility of the sudden loss of the connection of the UE, the AM service which cannot be successfully handed over is directly released, but not the UE is released.

Figure 3:
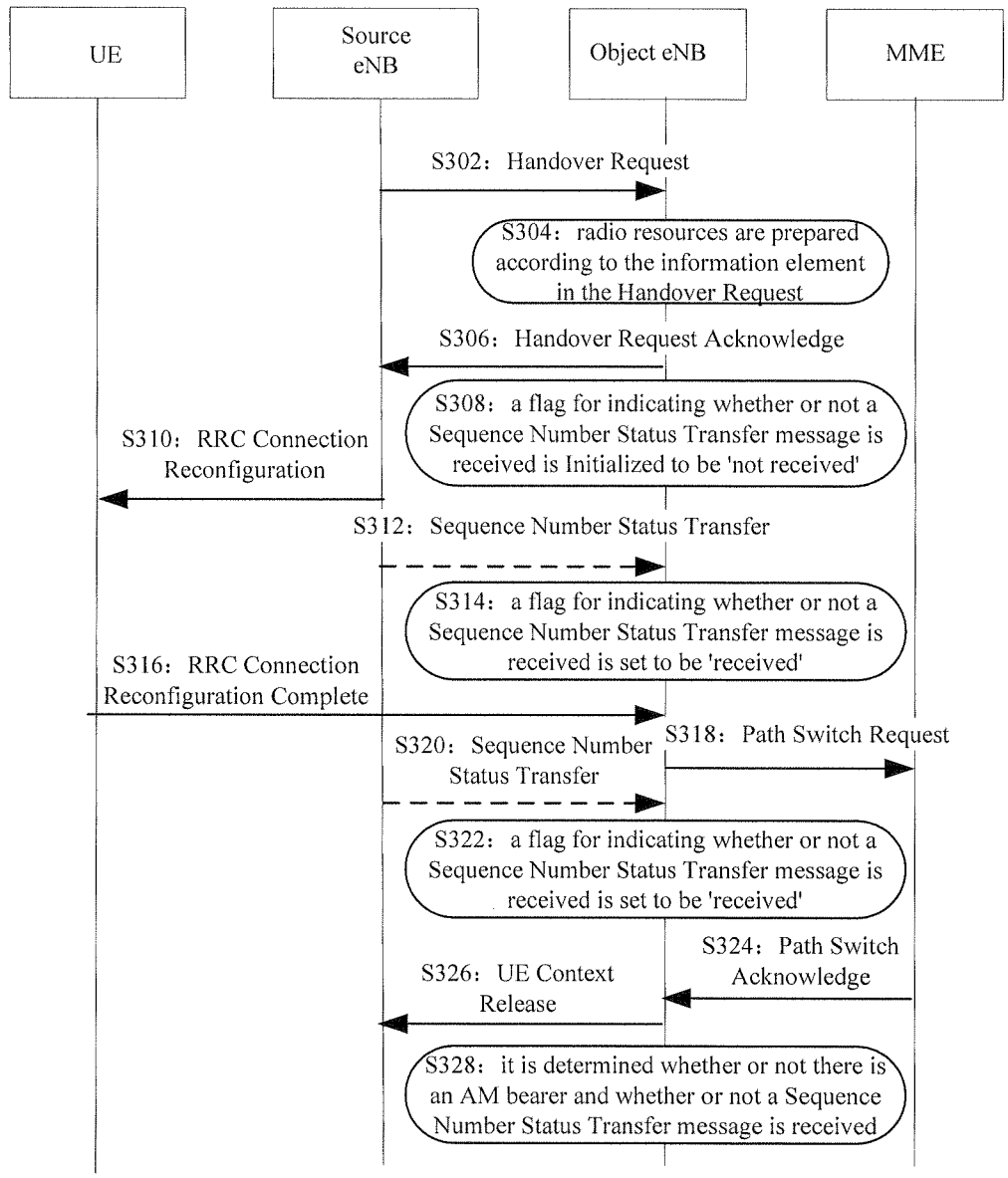
FIG. 3 is a flowchart illustrating an X2 handover involving UE, a handover source eNB, a target eNB and a core network according to a preferred embodiment of the disclosure.

In conclusion, the aforementioned embodiments may be summarized as follows, as shown in FIG. 3, according to a preferred embodiment of the disclosure, an X2 handover flow on a target side, which combines the aforementioned embodiments with existing X2 handover flow, may include the following steps:

S302: a source eNB determines that an X2 handover is needed and sends a Handover Request message to a target eNB via an X2 interface, wherein the handover includes but is not limited to a mobility-trigged handover. The Handover Request message contains but is not limited to the RRC context and the capability of the UE.

Step S304: the target eNB allocates resources to the UE to be switched in according to the information contained in the Handover Request message, prepares radio resource information and waits for the access of the UE.

Step S306: the target eNB constructs an RRC Connection Reconfiguration message to be sent to the UE via the source eNB, places the RRC Connection Reconfiguration message in a transmission container and sends the RRC Connection Reconfiguration message to the source eNB by a Handover Request Acknowledge message, wherein the Handover Request Acknowledge message further containing the inverse tunnel information of an E-RAB needing inverse transmission.

Step S308: after sending the Handover Request Acknowledge message, the target eNB starts a timer to wait for an RRC Connection Reconfiguration Complete message from the UE and initializes a flag for indicating whether or not a Sequence Number Status Transfer message is received to be 'not received'.

Step S310: the source eNB decodes the transmission container and sends the RRC Connection Reconfiguration message contained in the transmission container to the UE.

Step S312: the source eNB sends a Sequence Number Status Transfer message to the target eNB, this step is skipped if the source eNB considers there is no need to send the Sequence Number Status Transfer message.

Step S314: after receiving the Sequence Number Status Transfer message, the target eNB sets the flag for indicating whether or not a Sequence Number Status Transfer message is received to be 'received', this step is skipped if the processing of the source eNB is abnormal or the X2 interface losses the Sequence Number Status Transfer message.

Step S316: the UE accesses the target eNB and sends an RRC Connection Reconfiguration Complete message to the target eNB.

Step S318: the target eNB makes no determination on whether or not the Sequence Number Status Transfer message is received but sends a Path Switch Request message to the core network, wherein the Path Switch Request message contains but is not limited to services successfully accepted by the target eNB as well as the IP and the TEID allocated to the services in the target eNB.

Step S320: if the target eNB receives no Sequence Number Status Transfer message in step S310, then a Sequence Number Status Transfer message may be received at this time, this step is skipped if the source eNB considers there is no need to send a Sequence Number Status Transfer message.

Step S322: if the target eNB receives a Sequence Number Status Transfer message at this time, then the target eNB sets the flag for indicating whether or not a Sequence Number Status Transfer message is received to be 'received', this step is skipped if the processing of the source eNB is abnormal or the X2 interface losses the message.

Step S324: the target eNB receives a Path Switch Acknowledge message in which a list of services needing to be released may be contained.

Step S326: the target eNB sends a Context Release message to the source eNB.

Step S328: the target eNB determines whether or not there is a successfully handed-over AM service, if so, determines whether or not a flag for indicating whether or not a Sequence Number Status Transfer message is received is received, releases the AM services of the UE if the flag is not received, or considers the handover is succeeded if the flag is received.

Through the aforementioned flow, the target eNB directly sends a Path Switch Request message to a core network after receiving an RRC Connection Reconfiguration Complete message, without specifically starting a timer to wait for a Sequence Number Status Transfer message; moreover, the target eNB is capable of continuing to process a Sequence Number Status Transfer message while waiting for a Path Switch Acknowledge message, and after receiving the Path Switch Acknowledge message, the target eNB excludes the service needing to be released before determining whether or not there is an AM service, thus reducing the times of determination, besides, AM services of the UE, but not the UE, are directly released if no Sequence Number Status Transfer message is received, thus reducing the possibility of the sudden loss of the connection of the UE.

The aforementioned preferred embodiment is described below in detail in combination with examples:

Example 1

Figure 4:
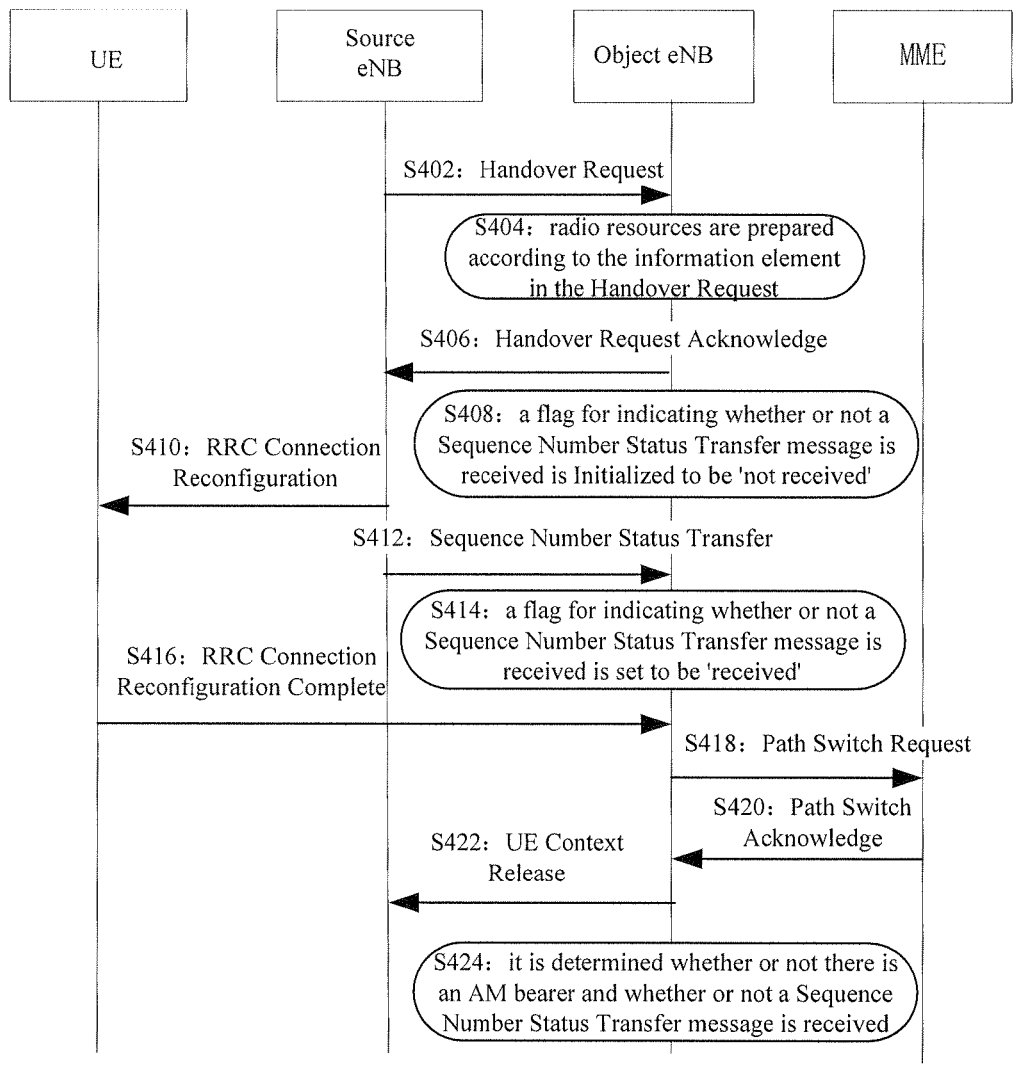
FIG. 4 is a flowchart illustrating an X2 handover involving UE, a handover source eNB, a target eNB and a core network according to embodiment 1 of the disclosure.

In this example, a Sequence Number Status Transfer message is received prior to an RRC Connection Reconfiguration Complete message, according to this example, an X2 handover flow, as shown in FIG. 4, includes:

Step S402: UE accesses a source eNB, establishes two AM services and sends a measurement report of Event A3 to the source eNB, the source eNB determines that an X2 handover is needed and sends a Handover Request message to a target eNB via an X2 interface, wherein the Handover Request message contains but is not limited to the RRC context and the capability of a UE.

Step S404: the target eNB allocates resources to the UE to be handed over according to the information contained in the Handover Request message, prepares radio resource information and waits for the access of the UE.

Step S406: the target eNB constructs an RRC Connection Reconfiguration message to be sent to the UE via the source eNB, places the RRC Connection Reconfiguration message in a transmission container and sends the RRC Connection Reconfiguration message to the source eNB by containing the RRC Connection Reconfiguration message in a Handover Request Acknowledge message, wherein the Handover Request Acknowledge message further contains the inverse tunnel information of an E-RAB needing inverse transmission.

Step S408: after sending the Handover Request Acknowledge message, the target eNB starts a timer to wait for an RRC Connection Reconfiguration Complete message from the UE and initializes a flag for indicating whether or not a Sequence Number Status Transfer message is received to be 'not received'.

Step S410: the source eNB decodes the transmission container and sends the RRC Connection Reconfiguration message contained in the transmission container to the UE.

Step S412: the source eNB sends a Sequence Number Status Transfer message to the target eNB.

Step S414: the target eNB sets the flag for indicating whether or not a Sequence Number Status Transfer message is received to be 'received' after receiving the Sequence Number Status Transfer message.

Step S416: the UE accesses the target eNB and sends an RRC Connection Reconfiguration Complete message to the target eNB.

Step S418: the target eNB sends a Path Switch Request message to a core network, wherein the Path Switch Request message contains but is not limited to services successfully accepted by the target eNB and the IP and the TEID allocated to the services in the target eNB.

Step S420: the target eNB receives a Path Switch Acknowledge message in which a list of services needing to be released is not carried.

Step S422: the target eNB sends a Context Release message to the source eNB.

Step S424: the target eNB determines that there is a successfully handed-over AM service and considers that the handover is succeeded after determining the Sequence Number Status Transfer message is received according to the flag.

Example 2

Figure 5:
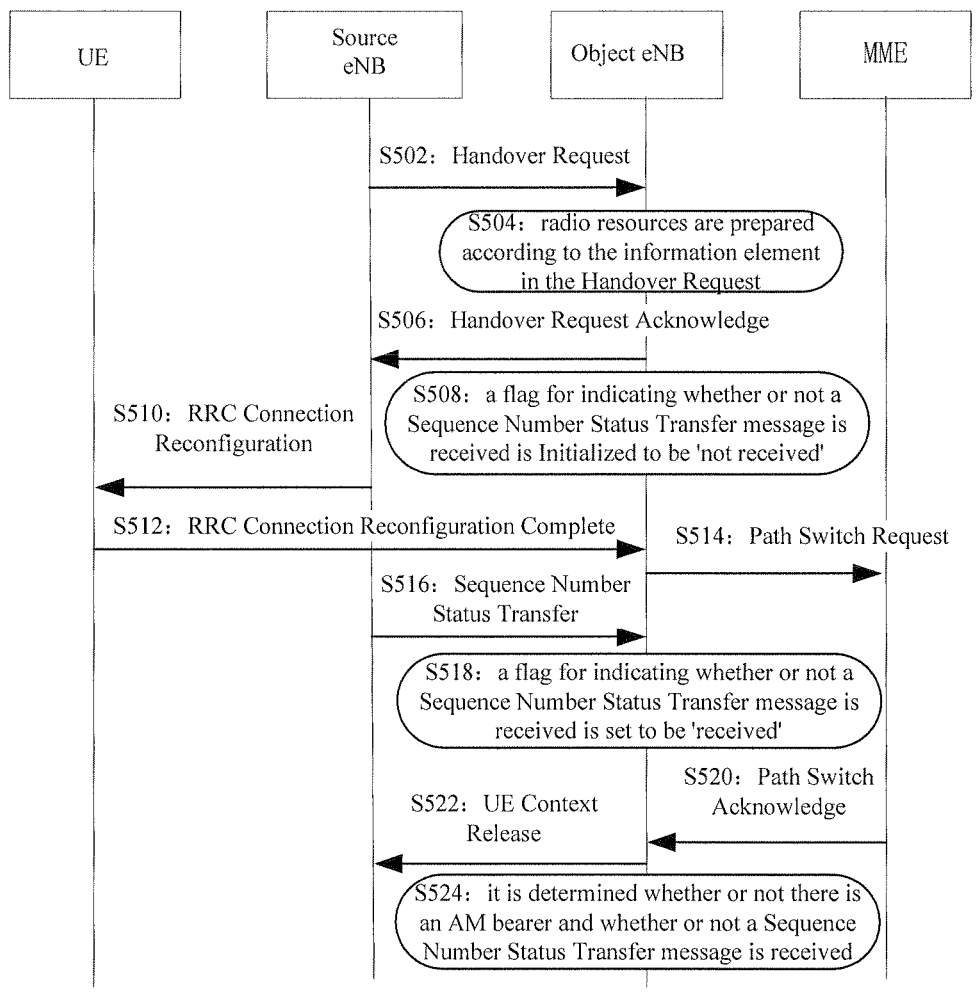
FIG. 5 is a flowchart illustrating an X2 handover involving UE, a handover source eNB, a target eNB and a core network according to embodiment 2 of the disclosure.

In this example, a Sequence Number Status Transfer message is received after an RRC Connection Reconfiguration Complete message, according to this example, an X2 handover flow, as shown in FIG. 5, includes:

Step S502: UE accesses a source eNB, establishes three AM services and sends the measurement report of event A3 to the source eNB, the source eNB determines that an X2 handover is needed and sends a Handover Request message to a target eNB via an X2 interface, wherein the Handover Request message contains but is not limited to the RRC context and the capability of the UE.

Step S504: the target eNB allocates resources to the UE to be handed over according to information contained in the Handover Request message, prepares radio resource information and waits for the access of the UE.

Step S506: the target eNB constructs an RRC Connection Reconfiguration message to be sent to the UE via the source eNB, places the RRC Connection Reconfiguration message in a transmission container and sends the RRC Connection Reconfiguration message to the source eNB by a Handover Request Acknowledge message, wherein the Handover Request Acknowledge message further contains the inverse tunnel information of an E-RAB needing inverse transmission.

Step S508: after sending the Handover Request Acknowledge message, the target eNB starts a timer to wait for an RRC Connection Reconfiguration Complete message from the UE and initializes a flag for indicating whether or not a Sequence Number Status Transfer message is received to be 'not received'.

Step S510: the source eNB decodes the transmission container and sends the RRC Connection Reconfiguration message contained in the transmission container to the UE.

Step S512: the UE accesses the target eNB and sends an RRC Connection Reconfiguration Complete message to the target eNB.

Step S514: the target eNB sends a Path Switch Request message to a core network, wherein the Path Switch Request message contains but is not limited to services successfully accepted by the target eNB and the IP and the TEID allocated to the services by the target eNB.

Step S516: the source eNB sends a Sequence Number Status Transfer message to the target eNB.

Step S518: the target eNB sets the flag for indicating whether or not a Sequence Number Status Transfer message is received to be 'received' after receiving the Sequence Number Status Transfer message.

Step S520: the target eNB receives a Path Switch Acknowledge message in which a list of services needing to be released is not carried.

Step S522: the target eNB sends a Context Release message to the source eNB.

Step S524: the target eNB determines that there is a successfully handed-over AM service and considers that the handover is succeeded after determining the Sequence Number Status Transfer message is received according to the flag.

Example 3

Figure 6:
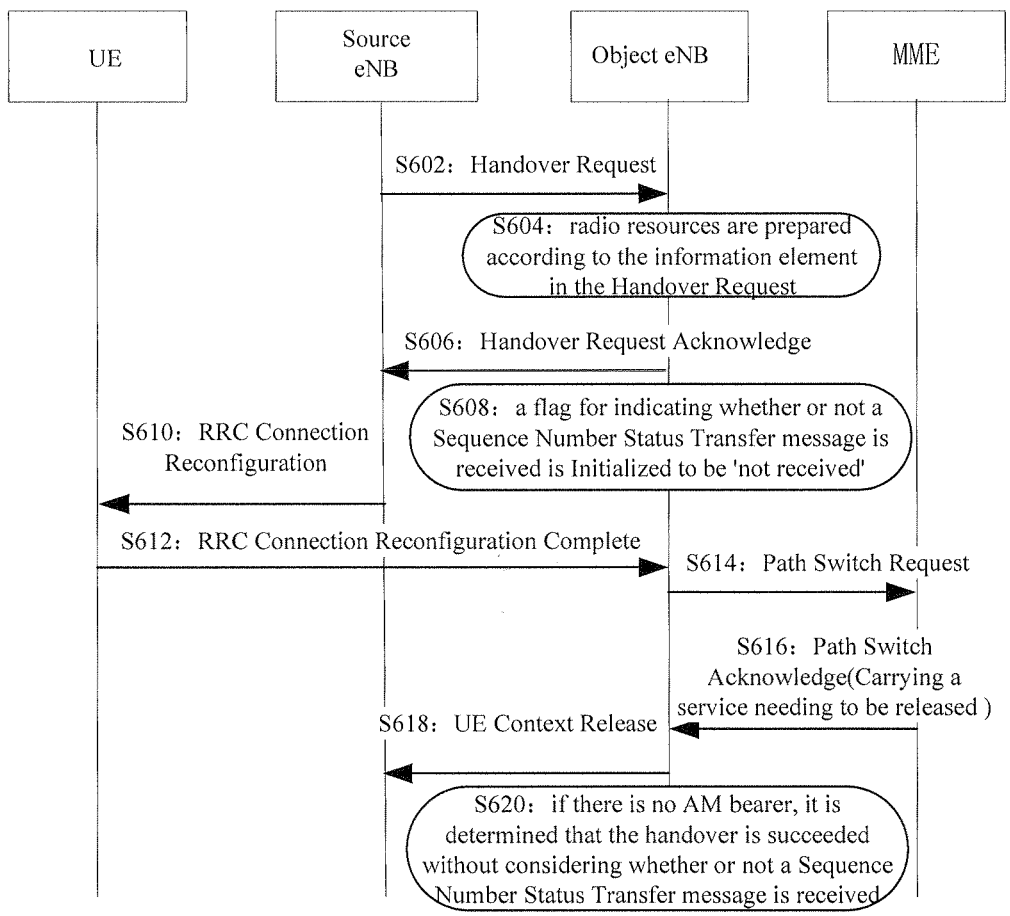
FIG. 6 is a flowchart illustrating an X2 handover involving UE, a handover source eNB, a target eNB and a core network according to embodiment 3 of the disclosure.

In this example, a Sequence Number Status Transfer message is not received by a target eNB due to a fault while no AM services are successfully handed over, according to this example, an X2 handover flow, as shown in FIG. 6, includes:

Step S602: UE accesses a source eNB, establishes one default UM bearer service E-RAB1 and two dedicated AM bearer services (E-RAB2 and E-RAB3), and sends a measurement report of Event A3 to the source eNB, the source eNB determines that an X2 handover is needed and sends a Handover Request message to a target eNB via an X2 interface, wherein the Handover Request message contains but is not limited to the RRC context and the capability of the UE.

Step S604: the target eNB allocates resources to the UE to be handed over according to information contained in the Handover Request message, prepares radio resource information and waits for the access of the UE.

Step S606: the target eNB constructs an RRC Connection Reconfiguration message to be sent to the UE via the source eNB, places the RRC Connection Reconfiguration message in a transmission container and sends the RRC Connection Reconfiguration message to the source eNB by a Handover Request Acknowledge message, wherein the Handover Request Acknowledge message further contains the inverse tunnel information of an E-RAB needing inverse transmission; and due to the insufficiency of radio resources, the target eNB accepts a failed AM bearer (E-RAB2).

Step S608: after sending the Handover Request Acknowledge message, the target eNB starts a timer to wait for an RRC Connection Reconfiguration Complete message from the UE and initializes a flag for indicating whether or not a Sequence Number Status Transfer message is received to be 'not received'.

Step S610: the source eNB decodes the transmission container and sends the RRC Connection Reconfiguration message contained in the transmission container to the UE.

Step S612: the UE accesses the target eNB and sends an RRC Connection Reconfiguration Complete message to the target eNB.

Step S614: the target eNB sends a Path Switch Request message to a core network, wherein the Path Switch Request message contains but is not limited to the services (E-RAB1 and E-RAB3) successfully accepted by the target eNB and the IPs and the TEIDs allocated to the services by the target eNB.

Step S616: the target eNB receives a Path Switch Acknowledge message and sends a Context Release message to the source eNB, as the path switch of the E-RAB3 is failed, the service E-RAB3 needing to be released is carried in the Path Switch Acknowledge message.

Step S618: the target eNB sends a Context Release message to the source eNB.

Step S620: as there is no successfully handed-over AM bearer, the target eNB considers that the handover is succeeded without determining whether or not a Sequence Number Status Transfer message is received.

Example 4

Figure 7:
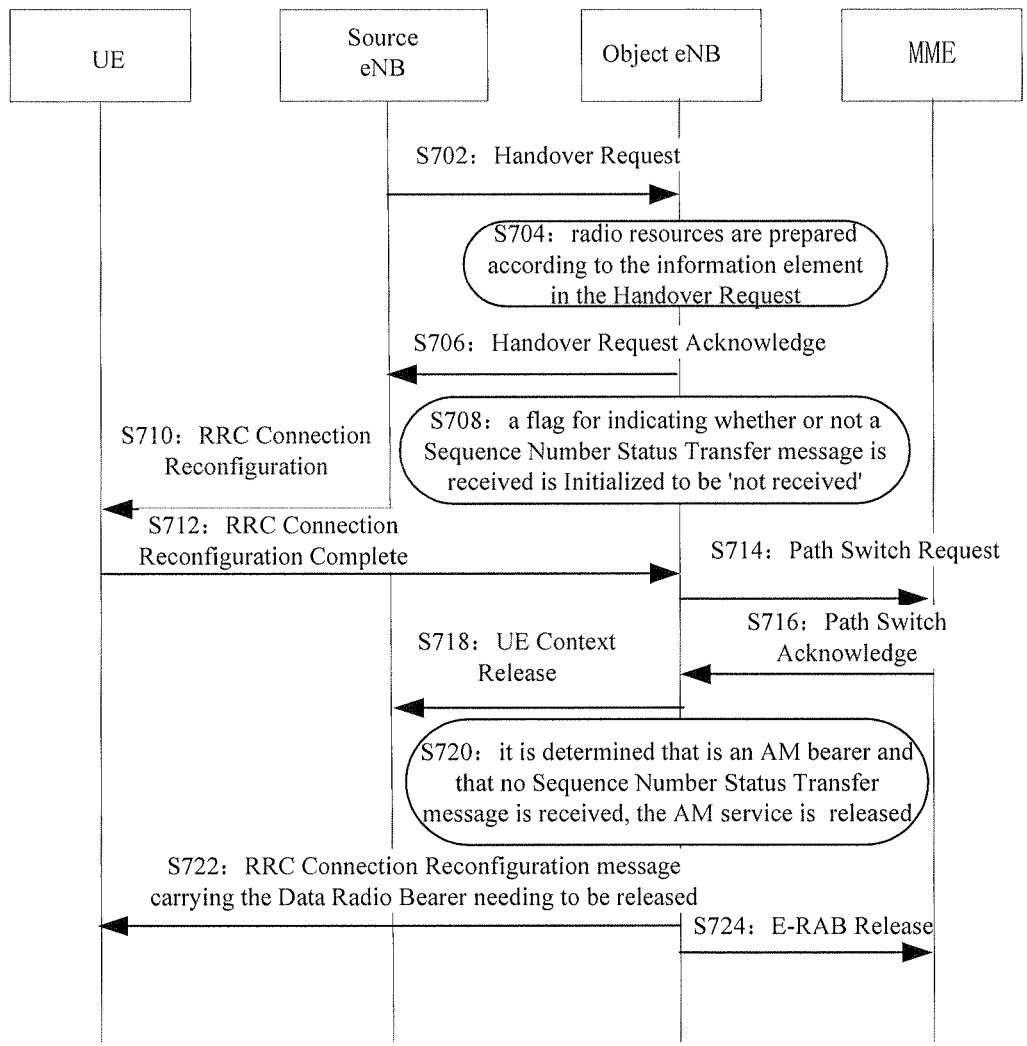
FIG. 7 is a flowchart illustrating an X2 handover involving UE, a handover source eNB, a target eNB and a core network according to embodiment 4 of the disclosure.

In this example, a Sequence Number Status Transfer message is not received by a target eNB due to a fault while AM services are successfully handed over, according to this example, an X2 handover flow, as shown in FIG. 7, includes:

Step S702: UE accesses a source eNB, establishes one default UM bearer service E-RAB1 and two dedicated AM bearer services (E-RAB2 and E-RAB3), and sends the measurement report of Event A3 to the source eNB, the source eNB determines that an X2 handover is needed, sends a Handover Request message to a target eNB via an X2 interface, wherein the Handover Request message contains but is not limited to the RRC context and the capability of a UE.

Step S704: the target eNB allocates resources to the UE to be handed over according to the information contained in the Handover Request message, prepares radio resource information and waits for the access of the UE.

Step S706: the target eNB constructs an RRC Connection Reconfiguration message to be sent to the UE via the source eNB, places the RRC Connection Reconfiguration message in a transmission container and sends the RRC Connection Reconfiguration message to the source eNB by a Handover Request Acknowledge message, wherein the Handover Request Acknowledge message further contains the inverse tunnel information of an E-RAB needing inverse transmission.

Step S708: after sending the Handover Request Acknowledge message, the target eNB starts a timer to wait for an RRC Connection Reconfiguration Complete message from the UE and initializes a flag for indicating whether or not a Sequence Number Status Transfer message is received to be 'not received'.

Step S710: the source eNB decodes the transmission container and sends the RRC Connection Reconfiguration message contained in the transmission container to the UE.

Step S712: the UE accesses the target eNB and sends an RRC Connection Reconfiguration Complete message to the target eNB.

Step S714: the target eNB sends a Path Switch Request message to a core network, wherein the Path Switch Request message contains a service successfully accepted by the target eNB and the IP and the TEID allocated to the service in the target eNB.

Step S716: the target eNB receives a Path Switch Acknowledge message in which services needing to be released are not carried.

Step S718: the target eNB sends a Context Release message to the source eNB.

Step S720: the target eNB determines that there is a successfully handed-over AM bearer and no Sequence Number Status Transfer message is received and releases the AM bearers E-RAB2 and E-RAB3.

Step S722: the target eNB sends the UE an RRC Connection Reconfiguration message carrying information of a Data Radio Bearer (DRB) needing to be released.

Step S724: the target eNB sends an E-RAB Release message to the core network.

Figure 8:
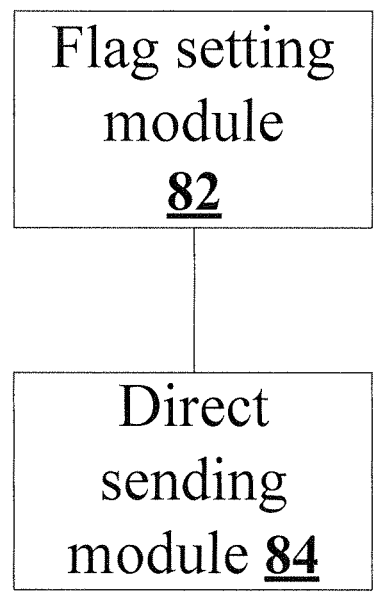
FIG. 8 is a block diagram illustrating the structure of an X2 handover device according to an embodiment of the disclosure.

FIG. 8 is a block diagram illustrating the structure of an X2 handover device according to an embodiment of the disclosure. As shown in FIG. 8, according to an embodiment of the disclosure, an X2 handover device includes:

a flag setting module 82 configured to set, for a handed-over UE, a flag for indicating whether or not a Sequence Number Status Transfer message is received after the eNB, to which the flag setting module 82 belongs, sends a Handover Request Acknowledge message, and to set the flag to be 'not received'; and a direct sending module 84 connected to the flag setting module 82 and configured to directly send a Path Switch Request message to a core network without determining whether or not a Sequence Number Status Transfer message is received after the eNB receives an RRC Connection Reconfiguration Complete message.

With the aforementioned device, after receiving an RRC Connection Reconfiguration Complete message, a target eNB directly sends a Path Switch Request message to a core network, without considering whether or not a Sequence Number Status Transfer message is received, and although the target eNB actually needs no Sequence Number Status Transfer message when initiating a path switch after receiving an RRC Connection Reconfiguration Complete message, to provide a criterion for the following determination on whether or not a Sequence Number Status Transfer message is received when the Sequence Number Status Transfer message is needed in the following handover flow, the target eNB sets, for handed-over UE, a flag for indicating whether or not a Sequence Number Status Transfer message is received at the beginning of a handover flow so as to provide an accurate reliable criterion for the following determination on whether or not a Sequence Number Status Transfer message is received. It can be seen from existing X2 handover flow that the setting that a target eNB receives a Sequence Number Status Transfer message prior to the initiation of a Path switch is irrational as no Sequence Number Status Transfer message is actually needed during the initiation of a Path switch by the target eNB receiving an RRC Connection Reconfiguration Complete message, moreover, a faulted link or the absence of an AM service in the handed-over will make the target eNB incapable of receiving a Sequence Number Status Transfer message, causing a delay in the whole handover flow. By rationally adjusting the way a Sequence Number Status Transfer message is processed, the device provided herein simplifies the processing of a target eNB and improves the whole handover speed.

Preferably, according to a preferred embodiment of the disclosure, the X2 handover device may further include: a first modification module configured to set the flag to be 'received' if the target eNB receives the Sequence Number Status Transfer message when waiting for completion of the RRC Connection Reconfiguration by the UE.

Preferably, according to a preferred embodiment of the disclosure, the X2 handover device may further include: a second modification module configured to set the flag to be 'received' if the target eNB receives the Sequence Number Status Transfer message when waiting for a Path Switch Acknowledge message.

The flag is used for indicating whether or not a Sequence Number Status Transfer message is received, thus, if the target eNB receives a Sequence Number Status Transfer message when waiting for the completion of the RRC Connection Reconfiguration of the UE or a Path Switch Acknowledge message, then the first or second modification module may set the flag to be 'received' to guarantee the status represented by the flag is accordant with the actual status.

Preferably, according to a preferred embodiment of the disclosure, the X2 handover device may further include: a service determination module configured to determine whether or not successfully handed-over services include AM services after the eNB receives the Path Switch Acknowledge message from the core network and consider that the handover is succeeded if the successfully handed-over services include no AM service.

If the switched-in UE has no AM service, the whole X2 handover flow actually needs no Sequence Number Status Transfer message. Thus, after receiving the Path Switch Acknowledge message sent from the core network, the service determination module may further determine whether or not successfully handed-over services include an AM service and directly determines that the handover is succeeded if the successfully handed-over services include no AM service.

Preferably, according to a preferred embodiment of the disclosure, the X2 handover device may further include: a flag determination module configured to determine whether or not the flag has been set to be 'received' when successfully handed-over services include AM services, determine the handover is succeeded if the flag is 'received', or release AM services of the UE if the flag is 'not received'.

If the handed-over UE has AM services, then a Sequence Number Status Transfer message is needed to guarantee the smooth handover of the AM services, in this case, whether or not the flag is set to be 'received' is determined, the setting of the flag to be 'received' indicates that the target eNB receives a Sequence Number Status Transfer message, in this case, the flag determination module determines that the handover is succeeded, the setting of the flag to be 'not received' indicates that the target eNB receives no Sequence Number Status Transfer message, in this case, to minimize the possibility of the sudden loss of the connection of the UE, the flag determination module directly releases the AM services which cannot be successfully handed over, but not release the UE.

It can be seen from the description above that on the basis of existing LTE technologies, the technical scheme provided herein effectively solves the problem that an RRC Connection Reconfiguration Complete message is received on the target side of an X2 handover when no Sequence Number Status Transfer message is received, simplifies the processing flow of an X2 handover and reduces the possibility of the interruption of services during a handover process, moreover, as whether or not there is a successfully handed-over AM service is determined after services needing to be released and the services not successfully accepted by the target eNB are excluded after a Path Switch Acknowledge message is received, the probability of the success of a handover is increased in the case where no Sequence Number Status Transfer message is received, thus greatly improving the performance of an LTE system and the user experience.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the disclosure is not restricted to any particular hardware and software combination.

The descriptions above are only the preferable embodiment of the disclosure, which are not used to restrict the disclosure. For those skilled in the art, the disclosure may have various changes and variations. Any amendments, equivalent substitutions, improvements, etc. within the disclosure are all included in the scope of the protection of the disclosure.

What is claimed is:

1. An X2 handover method, comprising:
   after sending a Handover Request Acknowledge message, a target eNodeB (eNB) setting, for handed-over User Equipment (UE), a flag for indicating whether or not a Sequence Number Status Transfer message is received and setting the flag to be 'not received'; and
   after receiving an RRC Connection Reconfiguration Complete message, the target eNB directly sending a Path Switch Request message to a core network without determining whether or not the Sequence Number Status Transfer message is received.

2. The method according to claim 1, wherein before the target eNB directly sending the Path Switch Request message to the core network without determining whether or not the Sequence Number Status Transfer message is received after receiving the RRC Connection Reconfiguration Complete message, the method further comprises:
   the target eNB setting the flag to be 'received' if the target eNB receives the Sequence Number Status Transfer message when waiting for completion of the RRC Connection Reconfiguration by the UE.

3. The method according to claim 1, wherein after the target eNB directly sending the Path Switch Request message to the core network without determining whether or not the Sequence Number Status Transfer message is received after receiving the RRC Connection Reconfiguration Complete message, the method further comprises:
   the target eNB setting the flag to be 'received' if the target eNB receives the Sequence Number Status Transfer message when waiting for a Path Switch Acknowledge message.

4. The method according to claim 3, wherein after the target eNB directly sending the Path Switch Request message to the core network without determining whether or not the Sequence Number Status Transfer message is received after receiving the RRC Connection Reconfiguration Complete message, the method further comprises:
   the target eNB determining whether or not successfully handed-over services include an Acknowledge Mode (AM) service after receiving the Path Switch Acknowledge massage sent from the core network, and determining that the handover is succeeded if the successfully handed-over services include no AM service.

5. The method according to claim 4, wherein the target eNB determining whether or not successfully handed-over services include the AM service after receiving the Path Switch Acknowledge massage sent from the core network, continuing to determine whether or not the flag has been set to be 'received' if the successfully handed-over services include the AM service, and, determining that the handover is succeeded if the flag has been set to be 'received' or releasing the AM service of the UE if the flag has not been set to be 'received'.

6. An X2 handover device located on an eNodeB (eNB), comprising:
   a flag setting module configured to set, for handed-over User Equipment (UE), a flag for indicating whether or not a Sequence Number Status Transfer message is received after the eNB sending a Handover Request Acknowledge message, and to set the flag to be 'not received'; and
   a direct sending module configured to directly send a Path Switch Request message to a core network without determining whether or not a Sequence Number Status Transfer message is received after the eNB receives an RRC Connection Reconfiguration Complete message.

7. The device according to claim 6, further comprising:
   a first modification module configured to set the flag to be 'received' if the target eNB receives the Sequence Number Status Transfer message when waiting for completion of the RRC Connection Reconfiguration by the UE.

8. The device according to claim 6, further comprising:
   a second modification module configured to set the flag to be 'received' if the target eNB receives the Sequence Number Status Transfer message when waiting for a Path Switch Acknowledge message.

9. The device according to claim 8, further comprising:
   a service determination module configured to determine whether or not successfully handed-over services include an AM service after the eNB receives the Path Switch Acknowledge message sent from the core network, and to determine that the handover is succeeded if the successfully handed-over services include no AM service.

10. The device according to claim 9, further comprising:
    a flag determination module configured to determine whether or not the flag has been set to be 'received' if the successfully handed-over services include the AM service, and, to determine the handover is succeeded if the flag has been set to be 'received' or release the AM service of the UE if the flag has been set to be 'not received'.

11. The method according to claim 2, wherein after the target eNB directly sending the Path Switch Request message to the core network without determining whether or not the Sequence Number Status Transfer message is received after receiving the RRC Connection Reconfiguration Complete message, the method further comprises:
    the target eNB setting the flag to be 'received' if the target eNB receives the Sequence Number Status Transfer message when waiting for a Path Switch Acknowledge message.

12. The device according to claim 7, further comprising:
    a second modification module configured to set the flag to be 'received' if the target eNB receives the Sequence Number Status Transfer message when waiting for a Path Switch Acknowledge message.

* * * * *